United States Patent
Goenka et al.

(10) Patent No.: US 11,699,127 B2
(45) Date of Patent: *Jul. 11, 2023

(54) SYSTEM AND METHOD FOR TRACKING STAPLE FIBER THROUGHOUT A TEXTILE SUPPLY CHAIN

(71) Applicant: WELSPUN INDIA LIMITED, Mumbai (IN)

(72) Inventors: Dipali Goenka, Mumbai (IN); Vipin Gandhi, Mumbai (IN)

(73) Assignee: Welspun India Limited, Maharashtra (IN)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,947

(22) Filed: Nov. 7, 2017

(65) Prior Publication Data
US 2018/0174095 A1 Jun. 21, 2018

Related U.S. Application Data

(63) Continuation of application No. 15/384,110, filed on Dec. 19, 2016, now Pat. No. 9,811,804.

(51) Int. Cl.
*G06Q 10/08* (2023.01)
*G06K 7/10* (2006.01)
(Continued)

(52) U.S. Cl.
CPC ....... *G06Q 10/087* (2013.01); *G06K 7/10366* (2013.01); *G06Q 10/0833* (2013.01); *G06Q 50/04* (2013.01); *G06Q 50/28* (2013.01)

(58) Field of Classification Search
CPC ......... G06K 19/07762; G06K 7/10366; G06Q 10/087; G06Q 10/0833; G06Q 50/28; G06Q 50/04
(Continued)

(56) References Cited

U.S. PATENT DOCUMENTS 9,489,650 B2 * 11/2016 Schoening .......... G06Q 10/0875
9,972,224 B2 * 5/2018 Renfro ...................... D06P 5/00
(Continued)

OTHER PUBLICATIONS

Raul Richero, A background analysis on Transparency and Traceability in the garment Value Chain, DAI Europe (Year: 2013).*
(Continued)

*Primary Examiner* — Ariel J Yu
*Assistant Examiner* — Denisse Y Ortiz Roman
(74) *Attorney, Agent, or Firm* — Offit Kurman, P.A.; Gregory A. Grissett

(57) ABSTRACT

A system and method for tracking fiber along a textile supply chain aids in product tracking and can verify fiber source/origin. However, verifying the fiber origin and type in a textile product purchased at a retail location back to the bale is complicated by the nature of textile processes along the supply chain. The system as described in the present application addresses complications, such as contamination/cross-contamination, and is used to track fiber from bales of fiber processed into a textile product throughout a sequence of textile operations. The system captures, for each textile operation, a) input information, b) output information, and c) equipment information related to the equipment used in the textile operation. The output information is associated with the input information of a subsequent textile operation, thereby associating the input information and output information, for each textile operation, with the fiber information for the bales of fiber.

8 Claims, 7 Drawing Sheets

(51) Int. Cl.
  *G06Q 50/28* (2012.01)
  *G06Q 50/04* (2012.01)
  *G06Q 10/087* (2023.01)
  *G06Q 10/0833* (2023.01)
(58) Field of Classification Search
  USPC .......................................................... 705/28
  See application file for complete search history.

(56) References Cited

U.S. PATENT DOCUMENTS

| | | | |
|---|---|---|---|
| 2015/0377792 A1* | 12/2015 | Renfro .................. | G01N 21/84 73/159 |
| 2016/0092812 A1* | 3/2016 | Bennington ..... | G06Q 10/06313 705/7.23 |
| 2017/0140330 A1* | 5/2017 | Rinzler ................ | H02J 7/0042 |
| 2018/0144232 A1* | 5/2018 | DeBates ............ | G06K 7/10366 |

OTHER PUBLICATIONS

Griva, RFID into a cost-saving manufacturing solution, Alien Technology (Year: 2007).*
Nayak; RFID in textile and clothing manufacturing: technology and challenges; Fashion and Textiles; pp. 1-16 (Year: 2015).*
Richero "A Background Analysis on Transparency and Traceability in the Garment Value Chain" (Year: 2016).*
Alien Technology Corporation "RFID Into a Cost-Saving Manufacturing Solution" (Year: 2007).*

* cited by examiner

SYSTEM AND METHOD FOR TRACKING STAPLE FIBER THROUGHOUT A TEXTILE SUPPLY CHAIN

CROSS REFERENCE TO RELATED APPLICATIONS

This application is a continuation of U.S. application Ser. No. 15/384,110, filed Dec. 19, 2016, the entire contents of which are incorporated by reference herein in its entirety.

TECHNICAL FIELD

The present disclosure relates to a system and method for tracking staple fibers throughout a textile supply chain. In particular, the system and method tracks fiber processed using short staple and/or long staple fiber spinning systems, yarns made from same, and finished textile products including such fibers.

BACKGROUND

Fiber origin and verification of fiber type in a textile product is an important component in the marketing of textile-based products. Marketing products made from fibers that have a specific geographic origin may command a price premium in the product. For example, Egyptian and Pima cotton fibers are superior cotton fibers that yields higher quality finished products compared to non-Egyptian or non-Pima cotton fibers.

The textile supply chain—from fiber through product—is complex and may involve manufacturing, distribution, and retail operations in several different countries around the world. The ability to verify the origin and type of fibers found in a product purchased at a retail location back to the bale is complicated by the nature of textile processes along the supply chain. While it is possible to determine a fiber type through laboratory testing of the end product, fiber identification alone does not give any visibility as to the specific fiber used, when it was first processed, and where (specific plant or location) it was processed. The textile manufacturer is theoretically in the best position to provide such information. If the textile manufacturer is not vertically integrated and must purchase yarns from a third party supplier, the best tracking system does not provide the ability to trace the fibers back to the particular bale and fiber source. For those textile manufactures that are vertically integrated, yarn-spinning systems may process fibers from multiple sources. For example, a ring-spun cotton yarn may include cotton fibers produced in the United States, India, Egypt, and/or China. There may be different fiber qualities used to produce a product based on the end-use and costs of cotton at any given time. In cotton spinning, in particular, it is often necessary to homogenize the cotton fibers during fiber preparation as much as possible to attain desired yarn quality, reduce defects, reduce end-breaks, and achieve end-product properties.

SUMMARY

An embodiment of the present disclosure is a method for making a textile product. The method includes capturing fiber information contained in tags associated with packaged yarn. The packaged yarn includes staple fibers and the tags include fiber information associated with bales of the staple fibers. The method includes processing the packaged yarn in a greige fabric formation operation, where the greige fabric formation operation includes an input as the packaged yarn, an output, and equipment used in the greige fabric formation operation. The method also includes capturing, for the greige fabric operation, a) input information contained in an input tag related to the input of the greige fabric formation operation, b) output information contained in an output tag related to the output of the greige fabric formation operation, and c) equipment information contained in an equipment tag related to the equipment of the greige fabric formation operation. The method further includes defining, via a computer system, a relationship between the input and the output of the greige fabric formation operation based on the input information, the output information, and the equipment information for the greige fabric formation operation. The method also includes associating, via a computer system, the fiber information for the bales of staple fibers with the output of the greige fabric formation operation based on a relationship between the input and the output of the greige fabric formation operation.

Another embodiment of the disclosure is a textile manufacturing system. The system includes a set of input tags coupled to inputs of a plurality of textile operations that transform staple fibers from bales of the staple fibers into a textile product, a plurality of units of textile equipment, and a set of textile equipment tags. Each of the textile equipment tags is coupled to a respective one of the units of textile equipment. The system also includes a set of output tags coupled to outputs of the plurality of textile operations and a set of tag readers configured to obtain information from the set of input tags for each one of the plurality of textile operations, the set of output tags for each one of the plurality of textile operations, and the set of textile equipment tags for each of the units of textile equipment. The system also includes a computer system in electronic communication with the set of tag readers. The computer system has a computer processor configured to a) define a relationship between an input, one of the units of textile equipment, and an output of each textile operation based on information captured from the set of input tags, the set of textile equipment tags, and the set of output tags, and b) define an association between the relationship between the input and the output of each textile operation, and fiber information related to the bales of the staple fibers. The computer processor also has a computer memory having stored thereon the association between the input and the output of each textile operation and the fiber information for the bales of the staple fibers.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown. In the drawings.

DETAILED DESCRIPTION OF ILLUSTRATIVE EMBODIMENTS

Systems and methods are described for tracking fiber source and/or fiber type throughout a textile supply chain. Typical tracking systems have implemented RFID tracking technology to track products along isolated portions of a textile supply chain. In one example, RFID tracking technologies have been used in the later phases of yarn manufacturing to manage inventory of finished cones of yarn. In another example, RFID tracking technologies have been used in weaving and dyeing finishing plants to track orders from weaving through shipment. Conventional systems have not been able to track inputs to outputs starting from bales of fiber through to the final product package and distribution to retailers. The present disclosure is directed to tracking fibers from receipt of bales of fiber through fiber preparation and through subsequent textile operations typical in textile manufacturing. The tracking system and method as described herein can be used with any type of staple fiber and yarn formation system. While the description below includes a description of textile processes typically associated with cotton yarn spinning and fabric production, the present disclosure is not limited to strictly cotton based yarn and fabric processes. Furthermore, the tracking system can be used to track textile products comprised of homogenous fibers and/or blended fibers. Tracking fibers throughout the supply chain may help prevent cross-contamination or unintentional mixing in the entire supply chain.

Figure 1:
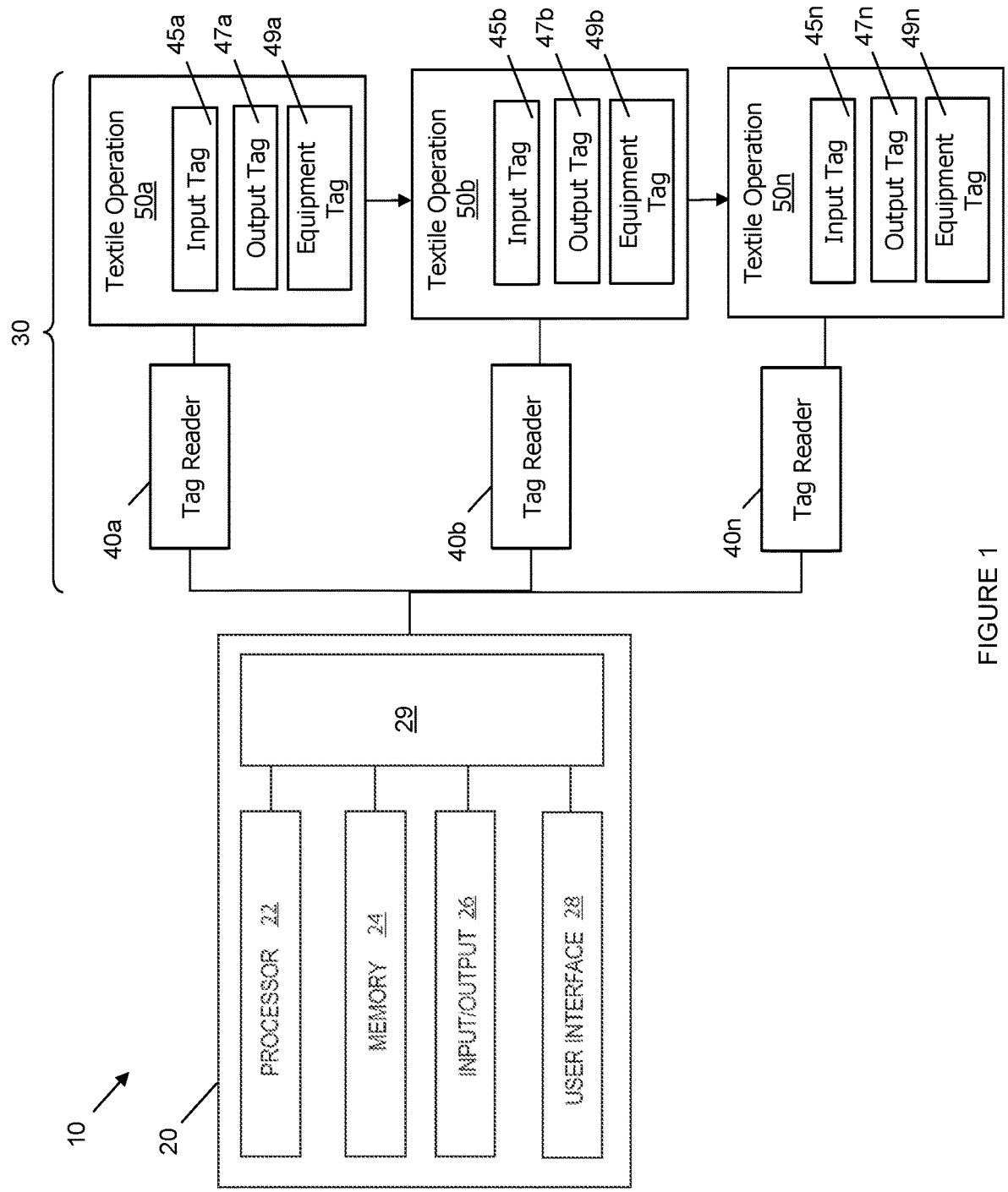
FIG. 1 is a schematic diagram of a system used to track fiber through a textile supply chain.

FIG. 1 illustrates a tracking system 10 for tracking fiber through a textile supply chain 30 according to an embodiment of the present disclosure. The textile supply chain 30 includes a sequence of textile operations $50a, 50b, \ldots 50n^{th}$ that transform bales of staple fibers into a finished textile product. Each textile operation $50a, 50b, \ldots 50n^{th}$ has an input, output, and equipment used in the textile operation. In the present application, a textile operation $50a, 50b, \ldots 50n^{th}$ is any process, machine, or procedure related to transforming fibers into completed textile products. In one example, textile operation may include fiber preparation (e.g. fiber blending, carding, drawing, combing), yarn spinning (e.g. on a ring frame), griege fabric formation (e.g. warping, sizing, and fabric formation), griege fabric process (e.g. dyeing, finishing, etc). A textile operation would also include any preliminary and/or intermediary storage and handling operations. Equipment as used herein includes machines, trolleys, cans, pallets, locations, storage racks, and/or any device, structure, or article used in the textile operation. The textile supply chain 30 is described in detail below. As used herein, "$n^{th}$ means refers to any additional number of structural features, elements, steps, or items. "$N^{th}$" does not denote the terminal or last structural feature, element, step, or item in a list.

The system 10 includes a set of tags $45a$-$49a$, $45b$-$49b$, $45n^{th}$-$49n^{th}$ for each textile operation $50a, 50b, \ldots, 50n^{th}$ in the textile supply chain 30. Each textile operation may include an input tag $45a$-$45n^{th}$, an output tag $47b$-$47n^{th}$, and an equipment tag $49b$-$49n^{th}$. The input tags $45a$-$45n^{th}$ contain input information related to the input of the textile operation. The output tags $47b$-$47n^{th}$ contain output information related to the output of the textile operation. The equipment tags $49b$-$49n^{th}$ contain equipment information related to the equipment used in the textile operation. Each tag can be electronic circuitry, an electronic device, and/or a code that contains information related to the textile operation. The tags can be electronic or non-electronic. The tag may be passive and contain information encoded in a bar code, QR code, or other scannable format. Alternatively, an electronic tag may be an active electronic tag and include transmission functionality that transmits information to a reader within its range. In one example, the electronic tag is an RFID tag. In one example, the RFID tags may be active RFID tags. In another example, the RFID tags may be passive RFID tags.

The system 10 includes multiple sets of electronic tag readers $40a, 40b, \ldots 400n^{th}$ configured to obtain information from the tags $45a, 45b, \ldots 45n^{th}$ for each one of textile operations $50a, 50b, \ldots 50n^{th}$. The electronic tag readers are devices used to obtain information contained in the tags. In one embodiment, the electronic tag readers can be scanning devices that can scan printed electronic codes to obtain information contained in the tag. Alternatively, the electronic tag readers may include receiving functionality that monitors the presence of tags within range of the readers and compiles the information contained within the tags. The electronic tag readers may be scanning towers and/or handheld scanning units. In another example, the electronic tag reader can be a smartphone or tablet.

The tracking system 10 also includes a computer device 20 in electronic communication with each electronic reader. The computer device 20 can define a relationship (e.g. a parent-child relationship) between the output of one textile operation and the input of a subsequent textile operation, as will be further explained below. This relationship is maintained from fiber through to the completed product and may be used to associate an output of a textile operation and/or the finished product with the fiber information contained in the initial tag placed on the bale when manufacturing began. The system 10 can facilitate the collection of other production data and information at each stage of manufacturing using one or more applications and/or software codes.

FIG. 1 illustrates an exemplary computing device 20 used to control operation of various aspects of the system. The computing device 20 is configured to receive, process, and store information used to implement one or more software applications, such as software application 29. The software application 29 may include native instructions for operation of the computing system and instructions for tracking fibers through the supply chain 30. The hardware components of computing device 20 include any appropriate device, examples of which include a portable computing device, such as a laptop, tablet, or smart phone, or other computing devices, such as a desktop computing device or a server-computing device.

As illustrated in FIG. 1, the computing device 20 includes one or more computer processors 22, a memory 24, input/output elements 26, and a user interface (UI) 28. It is emphasized that the operation diagram depiction of the computing device 20 is exemplary and is not intended to imply a specific implementation and/or configuration. The processor 22, memory 24, input/output portion 26, and user interface 28 can be coupled together to allow communications therebetween, and can interface with the software application 29. The software application 29 may include an application programmatic interface (API).

Continuing with FIG. 1, the memory 24 can be volatile (such as some types of RAM), non-volatile (such as ROM, flash memory, etc.), or a combination thereof, depending upon the exact configuration and type of processor 22. The computing device 20 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic storage or other magnetic storage devices, universal serial bus (USB) compatible memory, and/or any other medium which can be used to store information and which can be accessed by the computing device 20.

Continuing with FIG. 1, in various embodiments, the input/output portion 26 includes an antenna, lead or trace, electronic connector for wired connection, or a combination thereof. In some implementations, input/output portion 26 can include a receiver and transmitter, transceiver, or transmitter-receiver. The input/output portion 26 is capable of receiving and/or providing information concerning electronic tag readers. Furthermore, the input/output portion 26 is capable of receiving and/or providing information pertaining to communication with a network, such as for example, the Internet. As should be appreciated, transmit and receive functionality may also be provided by one or more devices external to computing device 20.

Referring to FIG. 1, the user interface 28, which can include an input device and/or display (input device and display not shown) that allows a user to communicate with or provide input instructions to the computing device 20. The user interface 28 can include inputs that provide the ability to control the computing device, via, for example, buttons, soft keys, a mouse, voice actuated controls, a touch screen, visual cues (e.g., moving a hand in front of a camera), or the like. The user interface 28 can provide outputs, including visual displays of the data obtained with the detection unit 18. Other outputs can include audio information (e.g., via speaker), mechanical information (e.g., via a vibrating mechanism), or a combination thereof. In various configurations, the user interface 28 can include a display, a touch screen, a keyboard, a mouse, an accelerometer, a motion detector, a speaker, a microphone, a camera, or any combination thereof. The user interface 28 can further include any suitable device for inputting biometric information, such as, for example, fingerprint information, retinal information, voice information, and/or facial characteristic information, for instance, so as to require specific biometric information for access to the computing device 20. It should be appreciated that the computer devices can operate via any suitable operating system, such as Android, BSD, iOS, Linux, OS X, QNX, Microsoft Windows, Windows Phone, and IBM z/OS. Furthermore, the software application can operate with any of the aforementioned operation systems.

In one embodiment, the computer processor 22 is configured to define a relationship between the input and the output for each textile operation based on the input information, the output information, and the equipment information. Furthermore, the computer processor 22 is configured to define a relationship between the input and output of each textile operation based on information captured from the set of tags associated with each textile operation. The computer processor 22 is also configured to associate the fiber information for the bales of staple fiber with the textile product based on the relationship between the input and the output for each textile operation in the sequence of textile operations. The computer memory 24 can store the association between the fiber information for the bales of staple fiber with the textile product based on the relationship between the input and the output for each textile operation in the sequence of textile operations using various equipment. The fiber information for each completed textile can be tracked through each textile operation using the association stored in the computer memory 24. In this way, the system 10 can actively track fibers throughout the textile supply chain 30.

Figure 2:
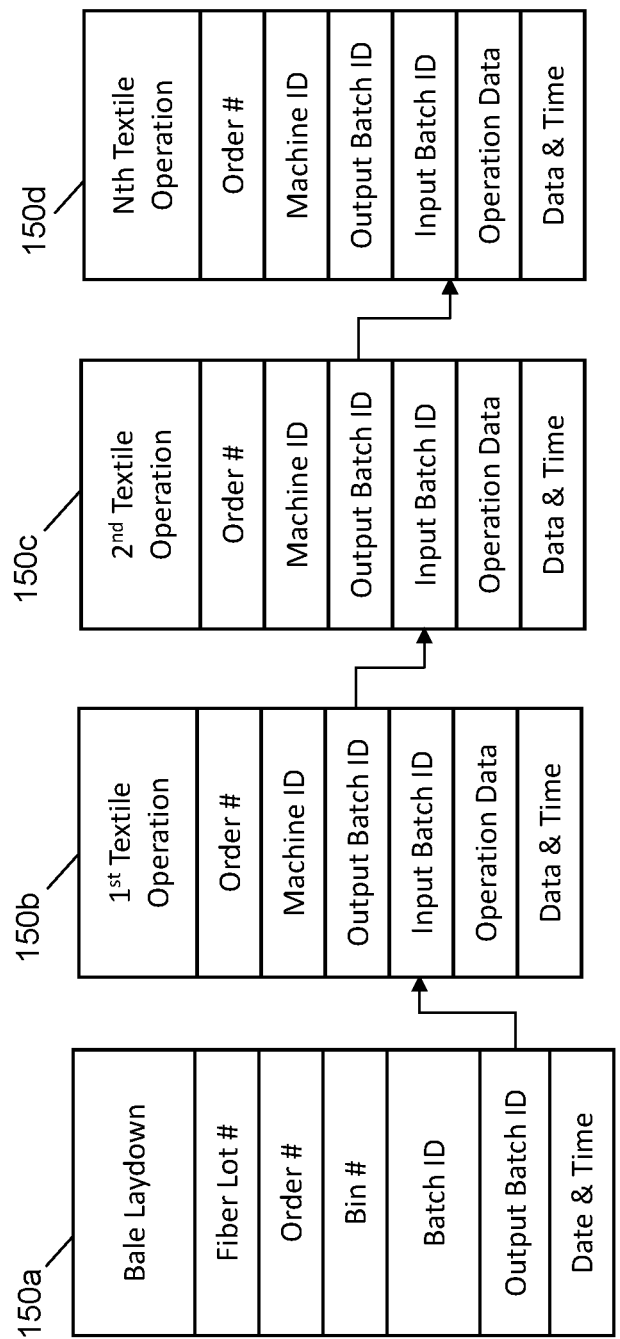
FIG. 2 illustrates exemplary data tables including information associated with fiber bales and subsequent textile operations in a textile supply chain.

FIG. 2 illustrates data obtained for each textile operation using the system and methods described in the present disclosure. As shown, data table 150a includes fiber information for the bales of staple fiber associated with bale lay down. The fiber information may include fiber lot number, order number, bin number, a batch identifier (ID), output batch ID, and date and time data. Fiber information may also include fiber vendor, source country or origin of the fiber, fiber type, shipment details, and one or more quality parameters for fiber.

Figure 4A:
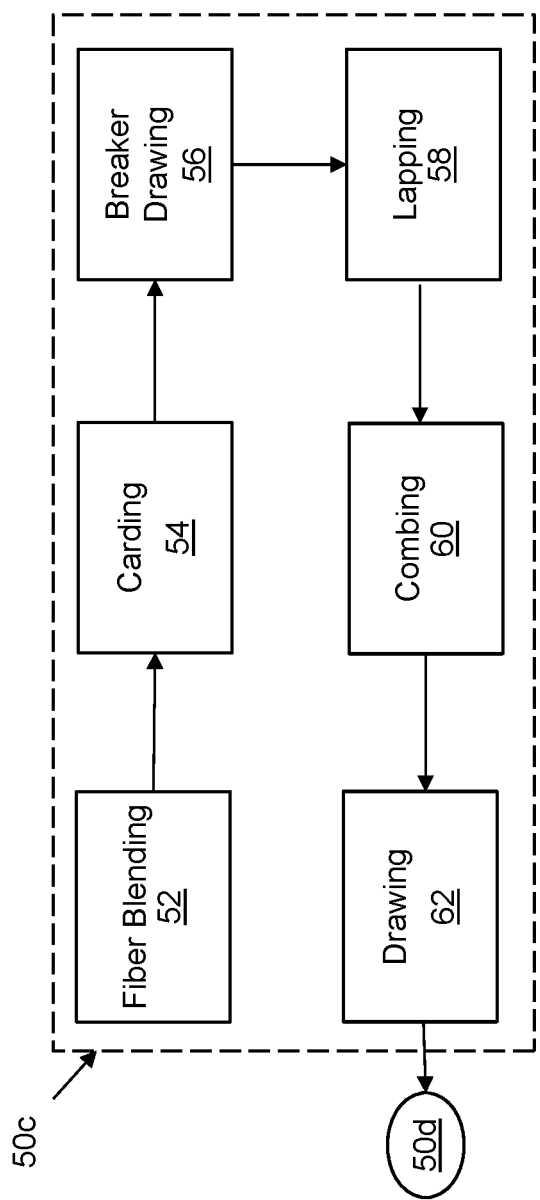
FIG. 4A is a process flow diagram illustrating a portion of the textile supply chain shown in FIG. 3.

Continuing with FIG. 2, data tables 150b, 150c, 150d include information for the textile operations that occur after bale lay down (see fiber staging 50b in FIG. 2). As shown in FIG. 4, data table 150b includes textile operation information for the first textile operation. The first textile operation information in data table 150b includes order number, machine ID, output batch ID, input batch ID, operation data, and date/time data, amongst other data like origin, vendor, etc. Data table 150c includes textile operation information for the second textile operation following the first textile operation. The second textile operation information in data table 150c includes order number, machine ID, output batch ID, input batch ID, operation data, and date/time data. Data table 150d includes textile operation information for the third textile operation following the second textile operation. The third textile operation information in data table 150d includes order number, machine ID, output batch ID, input batch ID, operation data, and date/time data. The system may include subsequent data tables for each textile operation and/or sub-operation, which includes similar information to the data tables 150a-150c.

The output batch ID for the bale associated with fiber bales becomes the input batch ID for the first textile operation (e.g. fiber preparation) in data table 150b. Likewise, the output batch ID for the first textile operation becomes the input batch ID for the second textile operation (e.g. yarn spinning) in data table 150c. The output batch ID for the second textile operation becomes the input batch ID for the third textile operation (e.g. yarn storage) in data table 150d. The relationship between data tables in subsequent operations is maintained throughout the textile supply chain.

Figure 3:
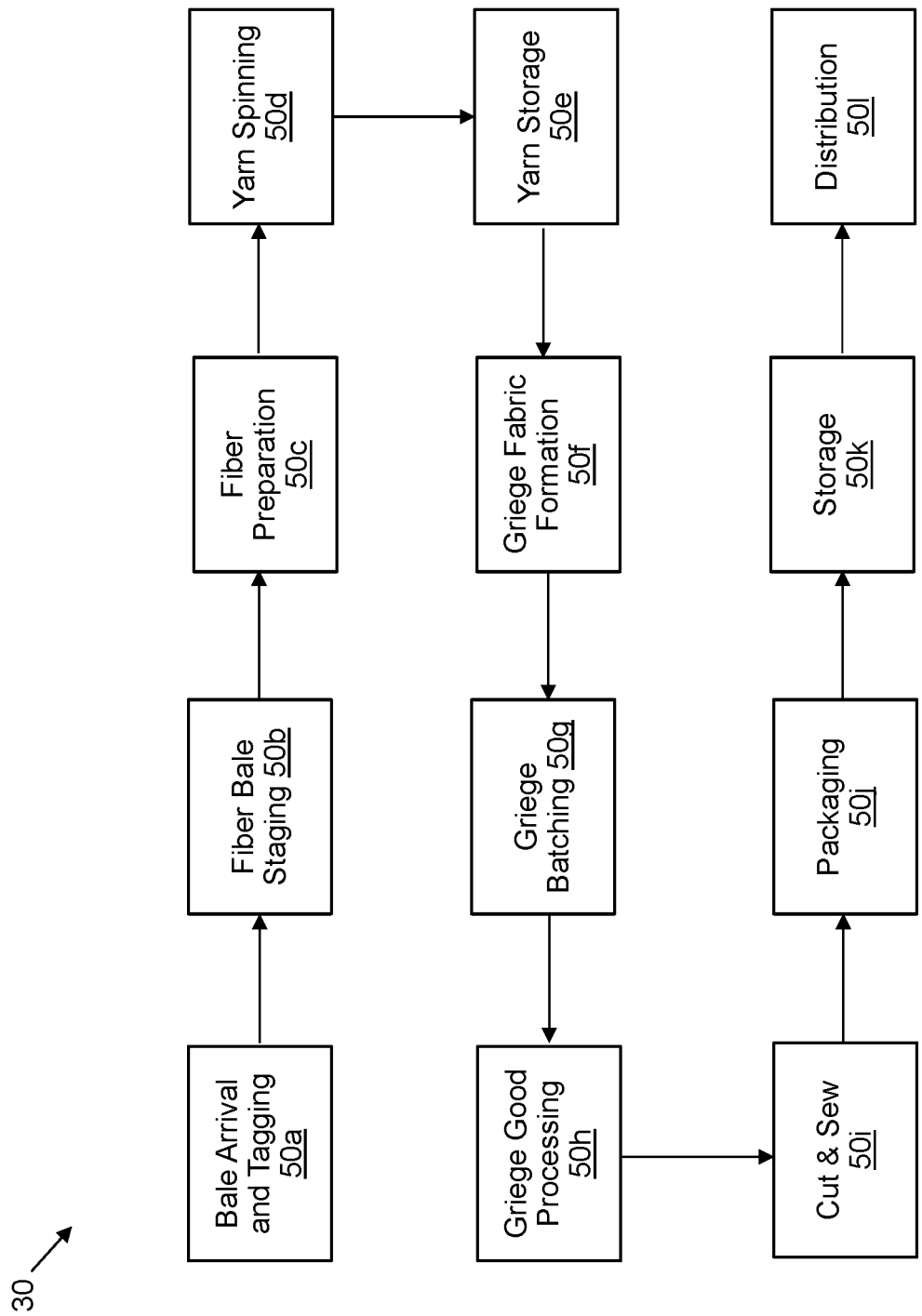
FIG. 3 is a schematic diagram for a textile supply chain.

As illustrated in FIG. 3, the first textile operation 50a is bale arrival and tagging. In operation 50a, bales of staple fibers are unloaded at the plant and tagged with bale tags that contain information related to the fiber, if the bales are not already tagged by the fiber supplier, such as the cotton ginners. Fiber information may include information shown in data table 150a illustrated in FIG. 2 and described above.

In FIG. 3, the second textile operation 50b may include fiber staging. Fiber staging may include transporting the bales of fiber from the loading dock through a gate of electronic tag readers to a staging area near blending machines. Fiber information contained in the bale tag is captured by electronic tag readers and is transmitted to the computing device 20. Fiber staging may also include arranging the bales of staple fiber into one or more bin locations or "bins." Each bin may include a bin tag that contains information related to the bales of fiber contained by that respective bin. Electronic readers may be used to capture the bin information contained in the bin tag. The computer processor 22 may associate the bin information with the fiber information obtained after the bale tags are read as described above. Fiber requirements for manufacturing a textile product can be compared to the information in the bin tags and the tags of the bales of fiber. If the information captured from the bale tags for the bales of fiber matches the manufacturing requirements of the textile product, those bales are selected for further processing in a fiber preparation operation 50.

Textile operation 50c comprises a fiber preparation operation. Fiber preparation operation 50c may include processes and equipment used to process bales of fiber into a form suitable for yarn spinning. In operation 50c, in general, the computer system can define a relationship between the input and output of the fiber preparation operation based on input information, output information, and equipment information for fiber preparation operation captured from the tags in the fiber preparation operation. The computer system may associate fiber information concerning bales of staple fiber with output of the fiber preparation operation based on the relationship between input and output for fiber preparation operation.

Fiber preparation operation 50c may include in additional operations typical of staple yarn manufacturing systems. Exemplary operations in fiber preparation operation 50c are shown in FIG. 4A. As illustrated, fiber preparation operation 50c may include fiber blending 52, carding 54, breaker drawing 56, lapping 58, optional combing 60, and finish drawing 62. After drawing 62, yarn spinning operation 50d forms yarn wound onto yarn packages. The yarn spinning operation 50d is described below.

Referring to FIG. 4A, the fiber blending operation 52 has an input that includes one or more input tags, and an output that includes one or more output tags. The input and output tags contain information related to the fiber blending operation input and the fiber blending operation output. Fiber blending 52 may include a blending machine or equipment that includes an electronic equipment tag. The fiber blending equipment may include one or more bale openers, blenders and bale breakers. Each fiber blending equipment in the blending operation includes an equipment tag containing information related to the respective piece of equipment. The system 10 may capture the input information, the output information, and the equipment information contained in the tags for the fiber blending operation 52. The operation information for blending may include, but is not limited to, an order number, machine ID, output batch ID, input batch ID, operation data, and date/time data. The computer processor may define a relationship between the input and the output of the fiber preparation operation based on the input information, the output information, and the equipment information for the fiber blending operation captured from the tags. The computer processor may associate the fiber information concerning the bales of staple fiber with the output of the fiber blending operation based on the relationship between the input and the output for fiber blending operation.

Figure 4B:
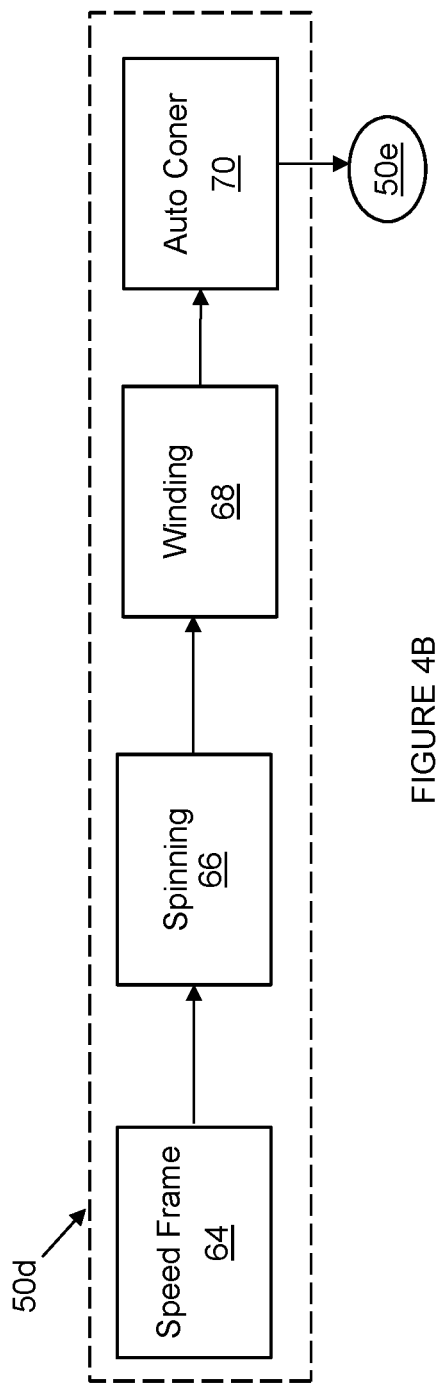
FIG. 4B is a process flow diagram illustrating a portion of the textile supply chain shown in FIG. 3.
Figure 4C:
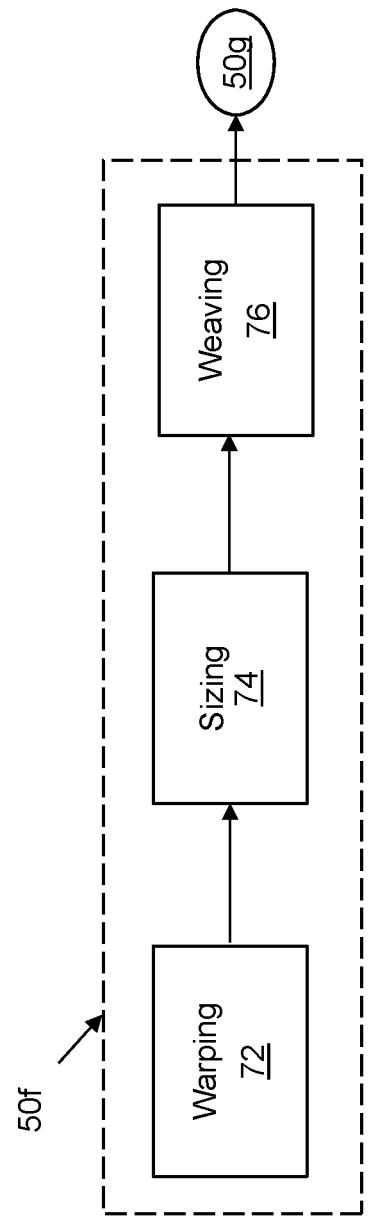
FIG. 4C is a process flow diagram illustrating a portion of the textile supply chain shown in FIG. 3.

Continuing with FIG. 4B, the textile operation 50c may comprise a fiber carding operation 54 having an input of blend fibers and an output of cans of sliver. The fiber carding operation 54 also includes input tags and output tags that contain information related to the fiber carding operation input and output, respectively. The fiber carding operation 54 may be performed using equipment such as one or more carding machines that includes an equipment tag that contains information related to the respective carding machine. The input tags may be applied to the input of the carding machines, i.e. the bales of staple fiber. The output tags may be affixed to the sliver cans at the output of the carding machine. The equipment tag may be affixed to or in proximity to the carding machines. The system 10 may capture the input information, the output information, and the equipment contained in the tags for the fiber carding operation 54. The carding operation information may include, but is not limited to, an order number, machine ID, output batch ID, input batch ID, operation data, and date/time data. The computer processor may define a relationship between the input and the output of the carding operation based on the input information, the output information, and the equipment information for the carding operation captured from the tags. The computer processor may associate the fiber information concerning the bales of staple fiber with the output of the carding operation based on the relationship between the input and the output for the carding operation.

Continuing with FIG. 4B, a breaker drawing operation 56 has an input of sliver cans and an output of sliver cans. Input tags are associated with the input sliver cans and the output has one or more output tags that contain information related to output sliver cans. The breaker drawing operation 56 may be performed using equipment such as one or more breaker draw frames that include an equipment tag each of which contains information related to the respective breaker draw frame. The input tags may be applied to the input of the breaker draw frames. The output tags may be affixed to the sliver cans at the output of the breaker draw frames. The equipment tag may be affixed to or in proximity to the breaker draw frames. The computer device 20 may capture the input information, the output information, and the equipment contained in the tags for the breaker drawing operation 56. The breaker drawing operation information may include, but is not limited to, an order number, machine ID, output batch ID, input batch ID, operation data, and date/time data. The computer processor may define a relationship between the input and the output of the breaker drawing operation 56 based on the input information, the output information, and the equipment information for the breaker drawing operation 56 captured from the tags. The computer processor may associate the fiber information concerning the bales of staple fiber with the output of the breaker drawing operation 56 based on the relationship between the input and the output for breaker drawing operation 56. The output sliver cans for the breaker drawing operation 56 are transferred to the lapping operation 58.

Continuing with FIG. 4B, a lapping operation 58 has an input of sliver cans and an output of wound laps on a trolley or other cart. The lapping operation includes input tags are associated with the input sliver cans and the output tags associated with the laps. The lapping operation 56 may be performed using equipment such as one or more uni-lap machines that include an equipment tag that contains information related to the respective uni-lap machine. In one example, the input tags may be applied to the input cans for the unilap machine. The output tags may be affixed to the laps at the output of the unilap machine. The equipment tag may be affixed to or in proximity to the unilap machine. The computer device 20 may capture the input information, the output information, and the equipment contained in the tags for the lapping operation 58. The lapping operation information may include, but is not limited to, an order number, machine ID, output batch ID, input batch ID, operation data, and date/time data. The computer processor may define a relationship between the input and the output of the lapping operation 58 based on the input information, the output information, and the equipment information for the lapping operation 58 captured from the tags. The computer processor may associate the fiber information concerning the bales of staple fiber with the output of the lapping operation 58 based on the relationship between the input and the output for lapping operation 58.

Continuing with FIG. 4B, a combing operation 60 has an input of sliver cans and an output of cans of combed sliver. The combing operation includes input tags are associated with the input sliver cans and the output tags associated with output cans. The combing operation 60 may be performed using equipment such as one or more combing machines that include an equipment tag that contains information related to the respective combing machine. In one example, the input tags may be applied to the input cans for the combing machine. The output tags may be affixed to output cans at of the combing machine. The equipment tag may be affixed to or in proximity to the combing machine. The computer device 20 may capture the input information, the output information, and the equipment contained in the tags for the combing operation 58. The combing operation information may include, but is not limited to, an order number, machine ID, output batch ID, input batch ID, operation data, and date/time data. The computer processor may define a relationship between the input and the output of the combing operation 58 based on the input information, the output information, and the equipment information for the combing operation 58 captured from the tags. The computer processor may associate the fiber information concerning the bales of staple fiber with the output of the combing operation 60 based on the relationship between the input and the output for combing operation 60.

Continuing with FIG. 4B, a drawing operation 62 has an input of sliver cans and an output of rovings. Input tags are associated with the input sliver cans and the output has one or more output tags that contain information related to output rovings. The drawing operation 62 may be performed using equipment such as one or more draw frames that include an equipment tag that contains information related to the respective draw frame. The input tags may be affixed to the input sliver cans of the draw frame. The output tags may be affixed to the output sliver cans of the draw frames. The equipment tag may be affixed to or in proximity to the draw frames. The computer device 20 may capture the input information, the output information, and the equipment contained in the tags for the drawing operation 62. The drawing operation information may include, but is not limited to, an order number, machine ID, output batch ID, input batch ID, operation data, and date/time data. The computer processor may define a relationship between the input and the output of the drawing operation 62 based on the input information, the output information, and the equipment information for the drawing operation 62 captured from the tags. The computer processor may associate the fiber information concerning the bales of staple fiber with the output of the drawing operation 62 based on the relationship between the input and the output for drawing operation 62. After the drawing operation, the output rovings from the draw frame are transferred to the yarn spinning operation 50*d*. The yarn storage operation 50*e* follows the yarn spinning operation 50*d* and is described further below.

The yarn spinning operation 50*d* has an input of rovings and an output that includes yarn bobbins or pallets of cones of yarn. The yarn spinning operation 50*d* may include one or more input tags and one or more output tags that contain information related to the input and outputs of yarn spinning operation 50*d*, respectively. As shown in FIG. 4B, it should be appreciated that the yarn spinning operation 50*d* may include additional sub-operations, such as speed frame operation 64, a spinning operation 66, a winding operation 68, and packing (auto-coner) operation 70.

Continuing with FIG. 4B, the speed frame operation 64 has input tags are associated with the input rovings and output tags that contain information associated with speed frame output. The speed frame operation 64 may be performed using equipment such as one or more speed frames that include an equipment tag that contains information related to the speed frame. The equipment tag may be affixed to or in proximity to the speed frame. The computer device 20 may capture the input information, the output information, and the equipment contained in the tags for the speed frame operation 64. The speed frame operation information may include, but is not limited to, an order number, machine ID, output batch ID, input batch ID, operation data, and date/time data. The computer processor may define a relationship between the input and the output of the speed frame operation 64 based on the input information, the output information, and the equipment information for the speed frame operation 64 captured from the tags. The computer processor may associate the fiber information concerning the bales of staple fiber with the output of the speed frame operation 64 based on the relationship between the input and the output for speed frame operation 64. After the speed frame operation, the output from the speed frame is transferred to the spinning frame.

The yarn spinning operation 66 may include a ring frame or spinning machine, input of rovings and an output of bobbins of spun yarn. The input tags may be affixed to the input spinning frame. The output tags may be associated with the output bobbins and affixed to a cart or other equipment that holds the bobbins for later processing. The computer device 20 may capture the input information, the output information, and the equipment contained in the tags for the spinning operation. The spinning operation information may include, but is not limited to, an order number, machine ID, output batch ID, input batch ID, operation data, and date/time data. The computer processor may define a relationship between the input and the output of the spinning operation 64 based on the input information, the output information, and the equipment information for the spinning operation 66 captured from the tags. The computer processor may associate the fiber information concerning the bales of staple fiber with the output of the spinning operation 66 based on the relationship between the input and the output for spinning operation 66.

As described above, the yarn spinning operation 50*d* may also include winding operation 68 and a packaging operation 70, as shown in FIG. 4B. The winding operation and the packaging operation include input tags, output tags, and equipment tags. The winding operation inputs may be yarn bobbins and the winding operation outputs may be yarn packages. The yarn packing operation inputs may be yarn cones directly from the ring frame and the output is pallets of yarn cones (or packaged yarns). The computer device 20 may capture the input information, the output information, and the equipment contained in the tags for the winding and the packaging operations, respectively. The operation information may include, but is not limited to, an order number, machine ID, output batch ID, input batch ID, operation data, and date/time data. The computer processor may define a relationship between the input and the output of respective winding and the packaging operations, 64 based on the input information, the output information, and the equipment information for the spinning operation 66 captured from the tags. The computer processor may associate the fiber information concerning the bales of staple fiber with the output of the winding operation and/or packaging operation.

After yarn spinning operation 50*d* as shown in FIG. 3, the packaged yarn is stored in a yarn storage operation 50*e*. Input and output tags contain information related to the yarn storage operation input and output. Equipment tags contain information related to pallet storage location that contains the yarn cones. Yarn storage information may include, but is not limited to, an order number, machine ID, output batch ID, input batch ID, operation data, and date/time data. The computer device 20 may capture the input information, the output information, and the equipment contained in the tags for the yarn storage operation 50*e*. The computer processor may define a relationship between the input and the output of yarn storage operation 50*e* based on the input information, the output information, and the equipment information for the yarn storage operation 50*e*. The computer processor may associate the fiber information concerning the bales of staple fiber with the output of the yarn storage information, as described above.

Textile operation 50*f* is the greige fabric formation operation 50*f* that has an input including one or more input tags and an output including one or more output tags. The one or more input and output tags contain information related to the greige fabric formation operation input (weft yarns, warp yarns, etc.) and outputs (greige fabric rolls). Griege fabric formation 50*f* may include additional operations, such as warping 72, sizing 74, and weaving 76, each of which include inputs, input tags, outputs, output tags, equipment, and equipment tags. The greige fabric formation operation 50*f* can be performed using equipment, such as one or more warp creels, a sizing machine, and weaving looms. Each warp creels, sizing machine, and weaving loom includes equipment tag that contains information related to the respective piece of equipment. The greige fabric information may include, for each operation an order number, machine ID, output batch ID, input batch ID, operation data, and date/time data and/or machine information. The computer device 20 may capture the input information, the output information, and the equipment contained in the tags for the fabric formation operations. The computer processor may define a relationship between the input and the output for each operation based on the input information, the output information, and the equipment information. The computer processor may associate the fiber information concerning the bales of staple fiber with the output for each fabric formation operation.

Continuing with FIG. 3, the textile operation 50*g* is a greige fabric batching operation. The greige fabric batching operation 50*g* has inputs, input tags, outputs, output tags, equipment, and equipment tags. The computer device 20 may capture the input information, the output information, and the equipment contained in the tags for the greige fabric batching. The greige fabric batching information may include, for each operation an order number, machine ID, output batch ID, input batch ID, operation data, and date/time data and/or machine information. The computer processor may define a relationship between the input and the output greige batching operation based on the input information, the output information, and the equipment information. The computer processor may associate the fiber information concerning the bales of staple fiber with the output for each greige fabric batching operation.

Textile operation 50*h* is a griege fabric processing operation having an input and an output. The input is greige fabric rolls and the output is finished or processed fabric rolls. The griege processing operation may include additional operations, such as a washing, bleaching (as needed), dyeing, finishing, and drying. The griege fabric processing operation has input tags containing information related to the griege fabric processing operation inputs, output tags that contain information related to the griege fabric processing operation outputs, and equipment tags. The griege processing operation may be performed using equipment that includes a washing machine, scouring machine, bleaching machine, dyeing machine, finishing machine, and/or a drying machine. The computer device 20 may capture the input information, the output information, and the equipment contained in the tags for the griege fabric operation 50*h*. The greige processing information may include, for each operation an order number, machine ID, output batch ID, input batch ID, operation data, and date/time data and/or machine information. The computer processor may define a relationship between the input and the output greige processing operation based on the input information, the output information, and the equipment information. The computer processor may associate the fiber information concerning the bales of staple fiber with the output for each greige processing operation.

Textile operation 50*i* is a cut and sew operation having an input and an output, one or more input tags that contain information related to the cut and sew operation input, and one or more output tags that contain information related to the cut and sew operation output. The cut and sew operation may include equipment tags associated with equipment used to package the finished products. The cut and sew operation may also include several sub-operations, including a length cut operation, a crosscut operation (as needed based on product type), hemming, and/or assembly. Each sub-operation will have its own respective input and output, and input and output tags. The computer device 20 may capture the input information, the output information, and the equipment contained in the tags for the griege fabric operation 50*h*. The cut and sew operation information may include, for each operation an order number, machine ID, output batch ID, input batch ID, operation data, and date/time data and/or machine information. The computer processor may define a relationship between the input and the output of the cut and sew operation based on the input information, the output information, and the equipment information. The computer processor may associate the fiber information concerning the bales of staple fiber with the output for the cut and sew operation.

Textile operation 50*j* is a packaging operation having an input (e.g. a finished, cut, and sewn product) and an output (e.g., a carton containing one or more packets of finished, cut and sewn products). The textile operation 50*j* also includes one or more input tags and one or more output tags that contain information related to the packaging operation input and output. The computer device 20 may capture the input information, the output information, and the equipment contained in the tags for the griege fabric operation 50*h*. The cut and sew operation information may include, for each operation an order number, machine ID, output batch ID, input batch ID, operation data, and date/time data and/or machine information. The computer processor may define a relationship between the input and the output of the packaging operation based on the input information, the output information, and the equipment information. The computer processor may associate the fiber information concerning the bales of staple fiber with the output for the packaging operation 50j.

Textile operation 50k is a warehouse storage operation having an input and an output, input tags, output tags, and equipment tags. The input and output of the warehouse storage operation may be pallets of packaged finished product. The computer device 20 may capture the input information, the output information, and the equipment contained in the tags for the warehouse storage operation 50k. The warehouse storage operation information may include, for each operation an order number, machine ID, output batch ID, input batch ID, operation data, and date/time data and/or machine information. The computer processor may define a relationship between the input and the output of the warehouse storage operation based on the input information, the output information, and the equipment information. The computer processor may associate the fiber information concerning the bales of staple fiber with the output for the warehouse storage operation 50k.

Textile operation 50l includes a distribution operation where packaged finished product is shipped to various distribution centers and retail locations. Each stage of the distribution operation 50l include tracking data that is associated with the tracking information obtained during the textile operations 50a through 50k described above. A consumer, retailer, or textile manufacturer can track fiber information from any point in the distribution operation back to through all of textile operations 50a through 50k to the specific bale of fiber used to make the product. Because fiber information for bales are "visible" throughout the supply chain, fiber source and origin can be verified. Furthermore, the systems and methods herein account for the variance in potential fiber processing routes through each textile operation.

Figure 5:
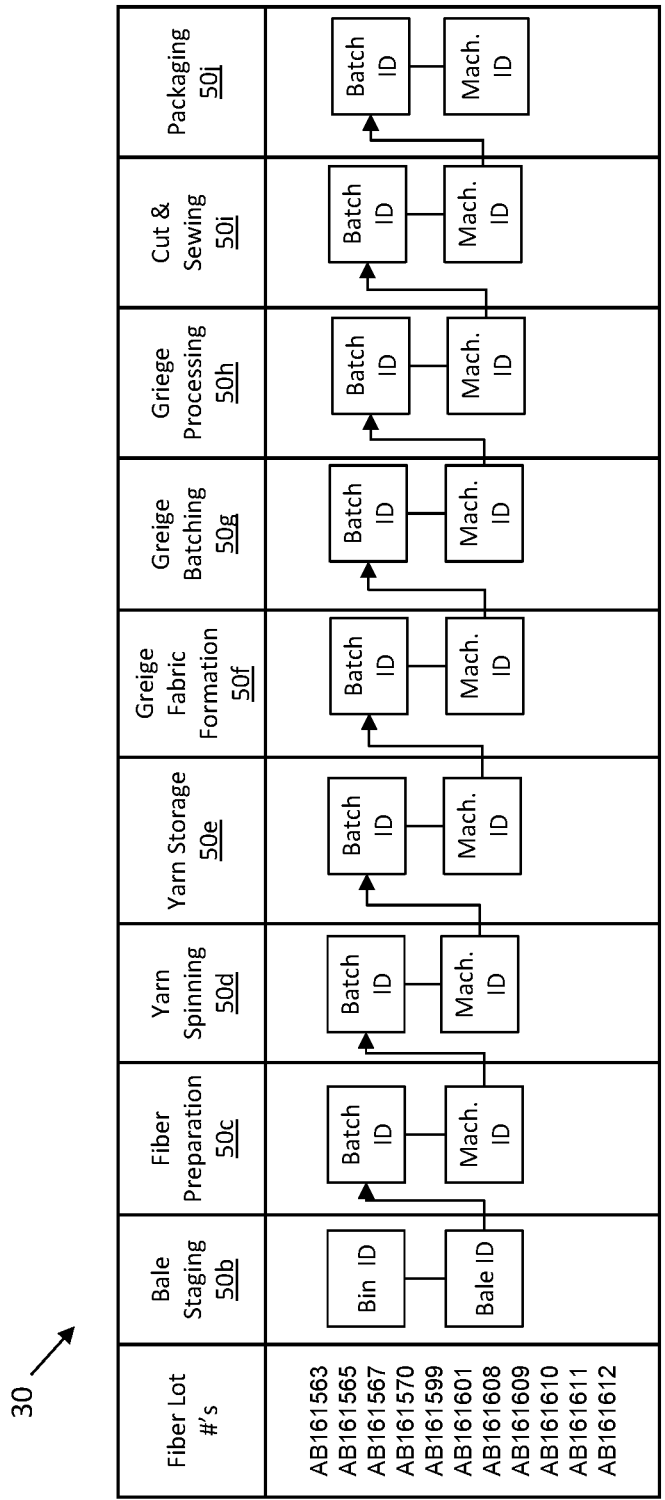
FIG. 5 is a process flow diagram illustrating a relationship between inputs and outputs for a sequence of textile operations in accordance with another embodiment of the present disclosure.

FIG. 5 illustrates data relationships for the textile operations in the textile supply chain 30. As described above, the bales of fibers are initially tagged with bale tags. The bales of fibers are assigned (or are received) in specific fiber lot numbers. During the staging operation 50b, each bin, which includes bin identifier, is associated with the bale identifier. Multiple bales may be associated with a unique bin. Bale identifier from staging 50b is associated with the machine identifier for the fiber preparation operation 50c. The fiber preparation operation includes a batch identifier associated with the machine identifier. The machine identifier for fiber preparation may be associated with a batch identifier for the yarn spinning operation. The batch identifier for the yarn spinning operation 50d is associated with a machine identifier for the yarn spinning operation 50d. This relationship between batch identifiers and the machine identifier carries through for each textile operation 50e through 50j. Therefore, the input in a piece of equipment is related to the output of that piece of equipment. The output, in turn, becomes the input into equipment in the subsequent textile operation. The computer device 20 can therefore define the relationships among inputs and outputs using input information, output information and the equipment information. The computer system maintains a database that includes relationship data for use in tracking a textile product back to fiber bales.

Figure 6:
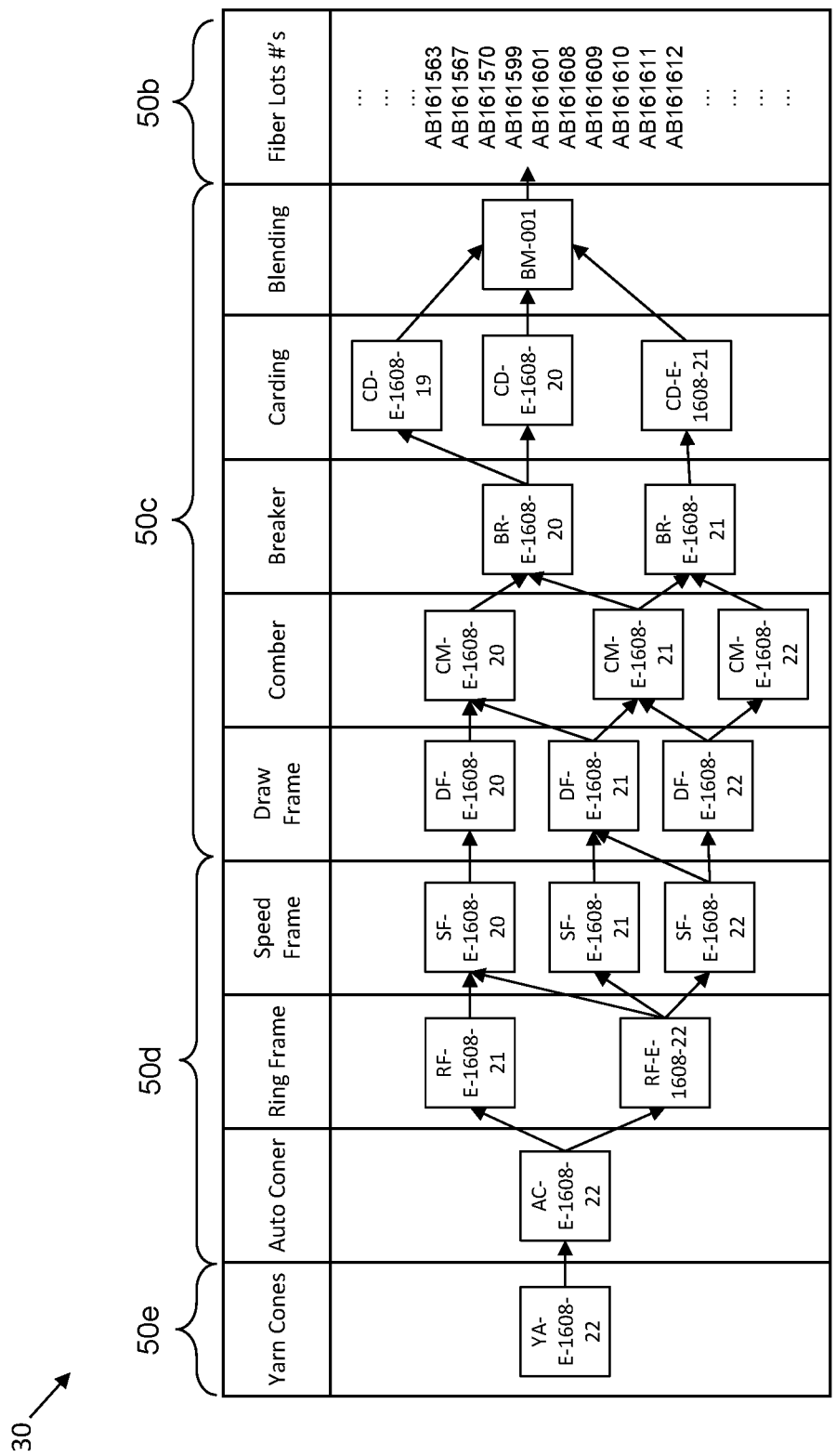
FIG. 6 is a process flow diagram illustrating a relationship between inputs and outputs for a portion of the sequence of textile operations illustrated in FIG. 5.

FIG. 5 illustrates an exemplary relationship between the inputs and outputs of textile operations fiber preparation and yarn spinning operations. In FIG. 6, each bale tag that has a fiber lot number. In some embodiments, the fiber lot number may be a fiber bale code. In FIG. 6, the fiber data code is "1608." The characters "1608" are exemplary and are used for illustrative purposes. Any type of character set can be used. Each textile operation 50b-50e (and sub-operations) has information associated with a subsequent textile operation and the previous textile operation, as explained above. As can be seen in FIG. 6, the fiber data code 1608 is carried through each textile operation throughout the supply chain 30. In many cases, the output of one textile operation may be divided into multiple inputs for another textile operation. For example, outputs from a carding machine may be divided among multiple draw frames (e.g., breaker draw frames) in the next operation. In the illustrated example, the fiber data code is maintained throughout each textile operation regardless of any cross feeding of outputs from one textile operation to the inputs of a subsequent textile operation. The directional arrows illustrate that at any given stage processing, computer device 20 has the fiber data code associated with the textile operation inputs and outputs. Accordingly, fiber information can be tracked back to specific bales or groups of bales, regardless of the point of inquiry along the supply chain 30.

While the disclosure is described herein using a limited number of embodiments, these specific embodiments are not intended to limit the scope of the disclosure as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in any particular order as desired.

What is claimed:

1. A method for making a textile product, the method comprising:

capturing fiber information contained in bale tags on bales of staple fiber via electronic bale tags, wherein the electronic bale tags include fiber information concerning the bales of staple fiber;

processing the bales of staple fiber in a fiber blending operation, wherein the fiber blending operation includes an input as the bales of staple fiber, an output as a blended mass of staple fibers, and a fiber blending machine that transforms the bales of staple fiber into the blended mass of staple fibers;

tracking, via non-electronic tags a) input for the fiber blending operation, b) output for the fiber blending operation, and the fiber blending machine that produced the blended mass of staple fibers in order to electronically associate the input, output and machine information for fiber blending with the fiber information concerning the bales of staple fiber, via a computer system;

processing the blended mass of staple fibers in a carding operation, wherein the carding operation includes an input as the blended mass of staple fibers, an output as slivers of staple fibers, and a carding machine that transforms the blended mass of staple fibers into the slivers of staple fibers;

tracking, via non-electronic tags, a) input for the carding operation, b) output for the carding operation, and the carding machine that produced the slivers of staple fibers in order to electronically associate the input, output and machine information for the carding operation with the fiber information concerning the bales of staple fiber, via the computer system;

processing the slivers of staple fibers in a breaker drawing operation, wherein the breaker drawing operation includes an input as the slivers of staple fibers, an output as drawn slivers of staple fibers, and a breaker draw frame that transforms the slivers of staple fibers into the drawn slivers of staple fibers;

tracking, via non-electronic tags, a) input for the breaker drawing operation, b) output for the breaker drawing operation, and c) the breaker draw frame that produced the drawn slivers of staple fibers in order to electronically associate the input, output and machine information for the breaker drawing operation with the fiber information concerning the bales of staple fiber, via the computer system;

processing the drawn slivers of staple fibers in a lapping operation, wherein the lapping operation includes an input as the drawn slivers of staple fibers, an output as wounded lap of staple fibers, and a lapping machine that transforms the slivers of staple fibers into the wounded lap staple fibers;

tracking a) input for the lapping operation, b) output for the lapping operation, and the lapping machine that produced the wounded lap of staple fibers in order to electronically associate the input, output and machine information for the lapping operation with the fiber information concerning the bales of staple fiber, via the computer system;

processing the wounded lap of staple fibers in a combing operation, wherein the combing operation includes an input as the wounded lap of staple fibers, an output as combed slivers of staple fibers, and a comber that transforms the wound lap of staple fibers into the combed slivers of staple fibers;

tracking a) input for the combing operation, b) output for the combing operation, and the comber that produced the combed slivers of staple fibers in order to electronically associate the input, output and machine information for the combing operation with the fiber information concerning the bales of staple fiber, via the computer system;

processing the combed slivers of staple fibers in a drawing operation, wherein the drawing operation includes an input as the combed slivers of staple fibers, an output as rovings of staple fibers, and a draw frame that transforms the combed slivers into rovings of staple fibers;

tracking a) input for the drawing operation, b) output for the drawing operation, and the draw frame that produced the rovings of staple fibers in order to electronically associate the input, output and machine information for the drawing operation with the fiber information concerning the bales of staple fiber, via the computer system;

processing the rovings of staple fibers in a spinning operation into packaged yarns, wherein the spinning operation includes an input as the rovings of staple fibers, an output as yarn packages of yarns of staple fibers, and a spinning frame that transforms the rovings of staple fibers into yarns of staple fibers;

tracking, via electronic tags, a) input for the spinning operation, b) output for the spinning operation, and the spinning frame that produced the yarns of staple fibers in order to electronically associate the input, output and machine information for the drawing operation with the fiber information concerning the bales of staple fiber, via the computer system;

capturing, for the yarn spinning operation, a) input information contained in an electronic input tag for the yarn spinning operation, b) output information contained in an electronic output tag for the yarn spinning operation, and c) equipment information contained in an electronic equipment tag for the yarn spinning operation;

capturing, for the textile product formation operation, a) input information contained in an electronic input tag for the textile product formation operation, b) output information contained in an electronic output tag for the textile product formation operation, and c) equipment information contained in an electronic equipment tag for the textile product formation operation; and associating, via the computer system, the fiber information for the bales of staple fiber obtained via the electronic bale tags with the textile product based on a relationship between the input and the output for each operation.

2. The method of claim 1, further comprising defining, via a computer system, the relationship between the input and the output for each operation based on the input information, the output information, and the equipment information for each operation.

3. The method of claim 1, wherein tracking a) input for the carding operation, b) output for the carding operation, and the carding machine that produced the slivers of staple fibers includes tracking using one or more non-electronic codes.

4. The method of claim 1, wherein tracking a) input for the breaker drawing operation, b) output for the breaker drawing operation, and c) the breaker draw frame that produced the drawn slivers of staple fibers includes tracking using one or more non-electronic codes.

5. The method of claim 1, wherein tracking a) input for the lapping operation, b) output for the lapping operation, and the lapping machine that produced the wounded lap of staple fibers includes tracking using one or more non-electronic codes.

6. The method of claim 1, wherein tracking a) input for the combing operation, b) output for the combing operation, and the comber that produced the combed slivers of staple fibers includes tracking using one or more non-electronic codes.

7. The method of claim 1, wherein tracking a) input for the drawing operation, b) output for the drawing operation, and the draw frame that produced the rovings of staple fibers includes tracking using one or more non-electronic codes.

8. The method of claim 1, wherein tracking a) input for the spinning operation, b) output for the spinning operation, and the spinning frame that produced the yarns of staple fibers includes tracking using one or more non-electronic codes.

* * * * *